Dec. 17, 1957     R. L. WORRELL     2,816,413
PICKUP ATTACHMENT
Filed June 21, 1954     5 Sheets-Sheet 2
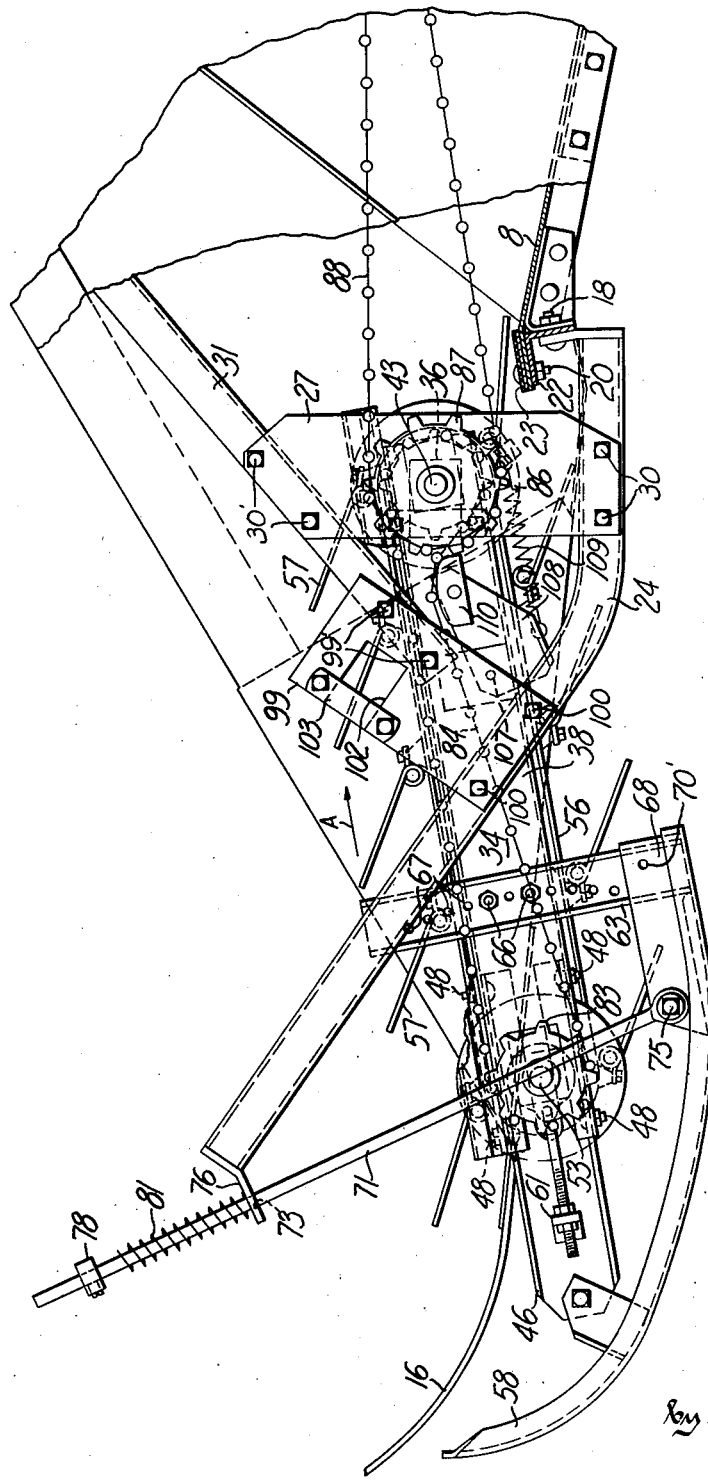
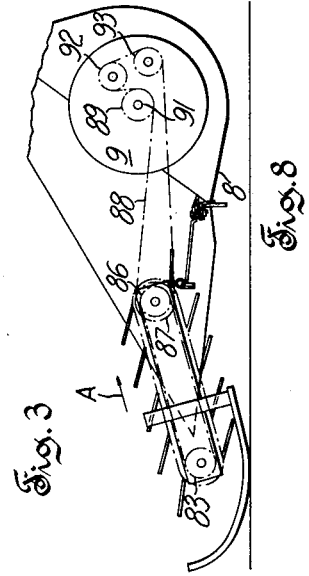
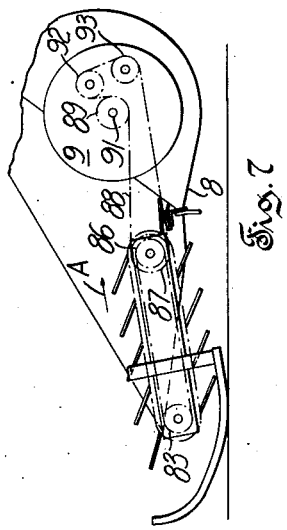
Inventor
Robert L. Worrell Dec. 17, 1957     R. L. WORRELL     2,816,413
PICKUP ATTACHMENT Filed June 21, 1954     5 Sheets-Sheet 3

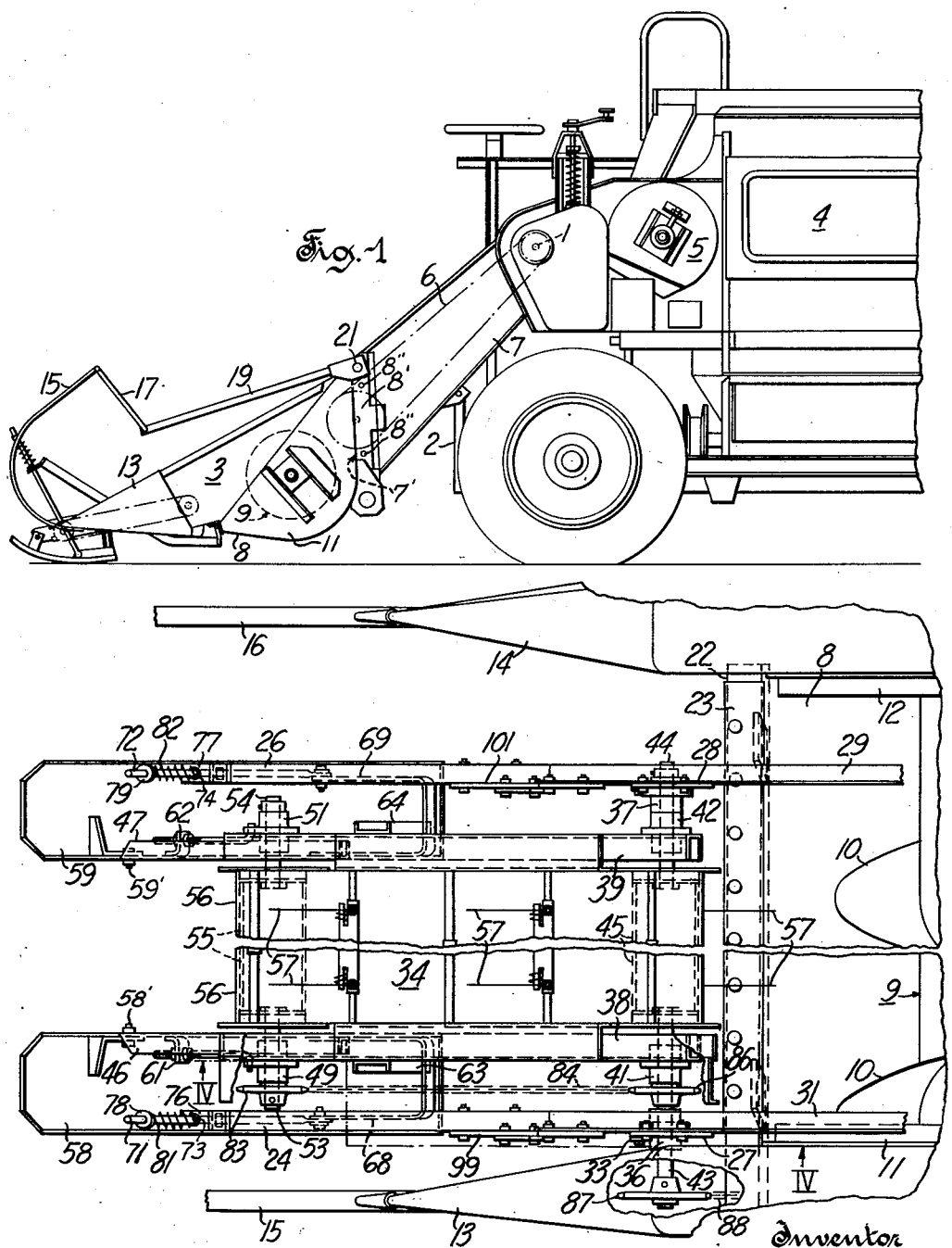

Inventor
Robert L. Worrell
by Kenneth McKivett
Attorney

Dec. 17, 1957  R. L. WORRELL  2,816,413
PICKUP ATTACHMENT
Filed June 21, 1954  5 Sheets-Sheet 4

Inventor
Robert L. Worrell
by Kenneth Chickiott
Attorney

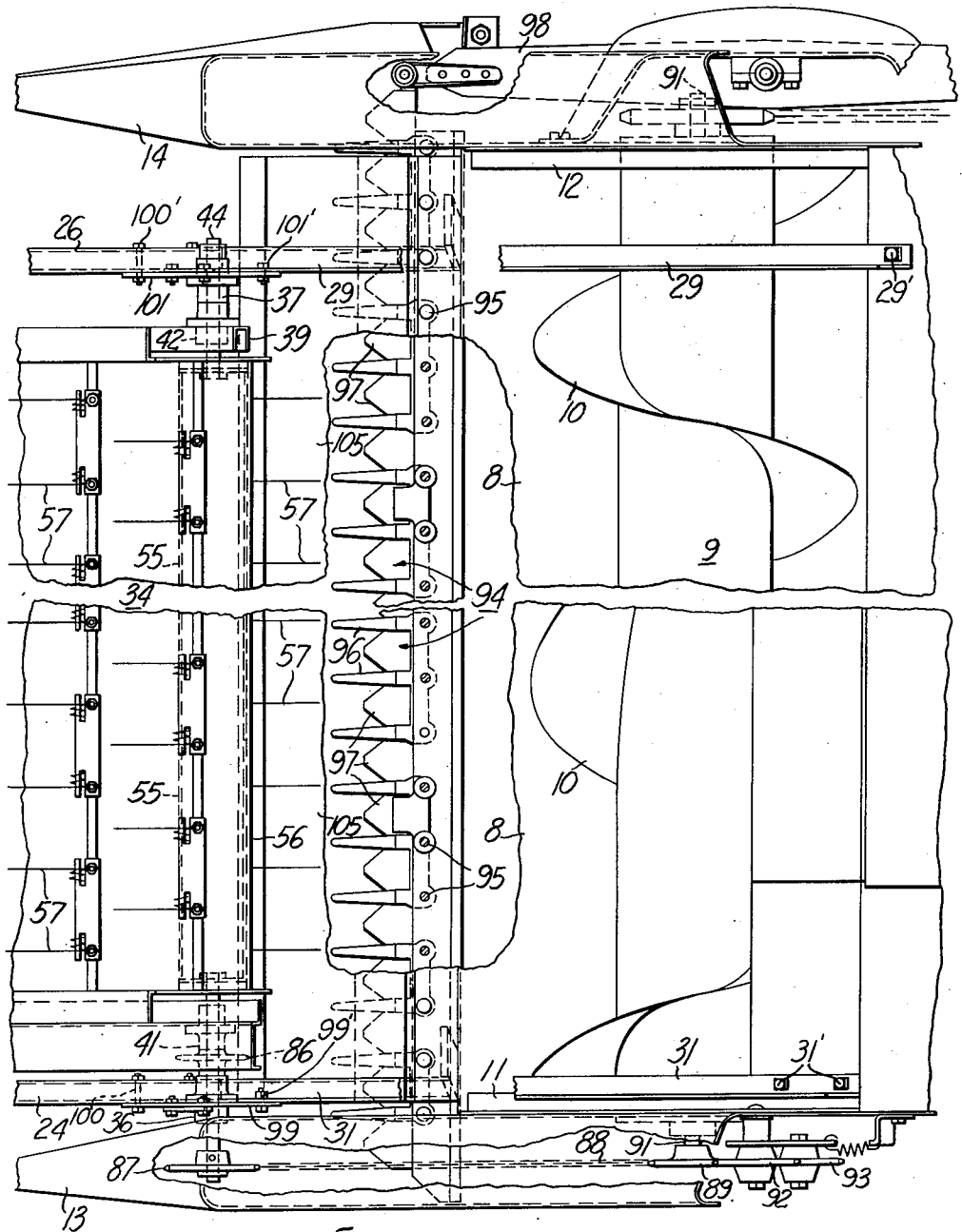

United States Patent Office 2,816,413
Patented Dec. 17, 1957

2,816,413

PICKUP ATTACHMENT

Robert L. Worrell, La Porte, Ind., assignor to Allis-Chalmers Manufacturing Company, Milwaukee, Wis.

Application June 21, 1954, Serial No. 438,082

5 Claims. (Cl. 56—364)

This invention relates generally to harvesting machines and more particularly to a pickup device positioned in discharge relation to a cross-conveyer carried by a harvester-thresher.

In the prior art, pickup devices have been mounted on a forward end of a combine header for picking up windrowed crops. These pickup devices have worked satisfactorily when the crop material had sufficiently long stems or the windrow was sufficiently heavy so that the pickup device could move the material rearwardly to a position where it could be acted upon by a conveying system of the harvester. However, these prior art pickup devices do not function satisfactorily with short stemmed crops or thin windrows as the crop material is not moved far enough rearward by the pickup device so that it is positioned for efficient handling by usual conveying mechanisms in the harvester. Many windrowed crops are short stemmed and cannot be raked into a heavy windrow without losing a large portion of the seeds carried by such crop.

It is, therefore, the prinicpal object of the invention to provide an improved pickup attachment which may readily be mounted on the header of a harvester-thresher when desired, and which includes a pickup device which may be selectively placed either into a condition for picking up and handling long stemmed crops or into a condition for picking up and handling short stemmed crops.

More specifically, it is an object of this invention to provide an improved pickup attachment of the hereinabove outline character which permits mounting of the pickup device closely adjacent to an auger type cross-conveyer of the header for handling light windrows or short stemmed material, and which permits mounting the same pickup device in spaced relation to the cross conveyer when long stemmed material or heavy windrows are being handled.

These and other objects will become apparent and be more fully explained as this description progresses.

Now referring to the accompanying drawings:

Fig. 1 is a side elevation of the forward end of a self-propelled harvester-thresher embodying the invention;

Fig. 2 is an enlarged fragmentary plan view of a forward portion of the harvester-thresher shown in Fig. 1 with some parts broken away;

Fig. 3 is an enlarged side elevation view of the forward portion of the harvester-thresher shown in Fig. 1 with some parts broken away and some parts in section;

Fig. 7 is a diagrammatic side elevation view similar to Fig. 3 showing the drive means for a pickup device;

Fig. 8 is a diagrammatic side elevation view similar to Fig. 7 but with the pickup device positoned in an adjusted position;

Fig. 10 is an enlarged fragmentary plan view of a portion of a harvester-thresher with a pickup device in adjusted position and with some parts broken away.

Figure 4:
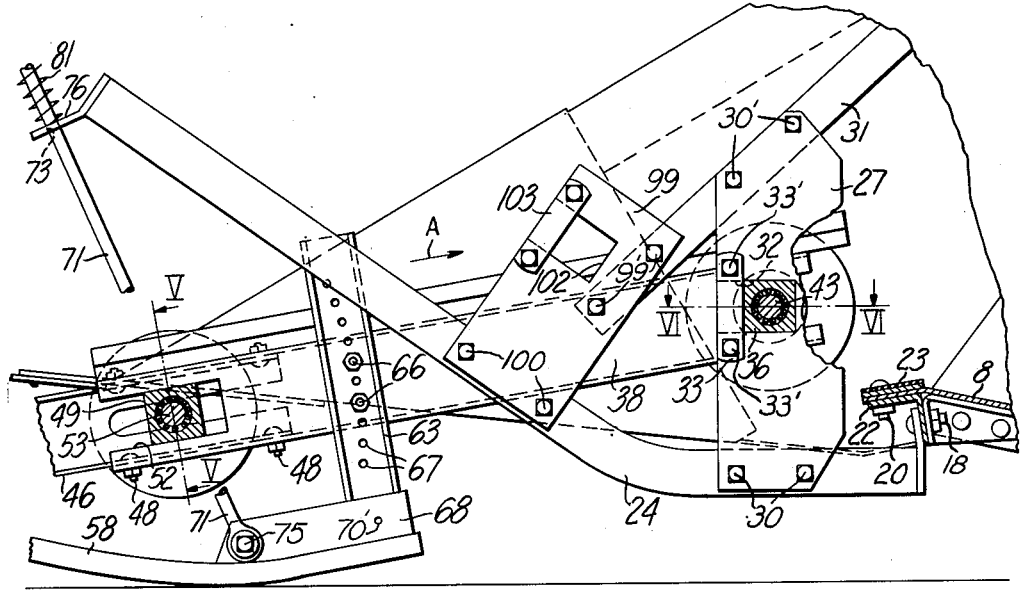
Fig. 4 is an enlarged section taken on line IV—IV of Fig. 2 with some parts broken away.

Referring to the drawings, an embodiment of the invention is shown in Figs. 1 and 2 in the form of a pickup attachment mounted on the forward end of a harvester-thresher header. This header is pivotally attached to the forward end of a self-propelled harvester-thresher for fore and aft up and down swinging movement about a horizontally extending shaft 1 (Fig. 1). Adjusting mechanism including a link 2 is provided for holding the front end of header 3 at any desired height above the ground. The harvester-thresher includes a conventional separating mechanism indicated generally by reference numeral 4, a threshing cylinder 5 rotatably supported in side walls of the harvester-thresher, and an endless conveyer 6 having its upper end operatively mounted about shaft 1. Conveyer 6 is operatively mounted within feed housing 7 which forms an upper portion of header 3 and which housing is provided at its lower end with a material receiving opening 7'. Conveyer 6 is adapted to receive cut grain for movement through feed housing 7 to a position where the grain can be acted upon by the threshing cylinder 5.

The forward lower part of the header 3 is formed by a transversely extending trough like structure 8 which, as indicated in Fig. 1, has a vertical connecting flange 8' at its rear side in laterally overlapping relation to the adjacent side wall of the feed housing 7, and another vertical connecting flange, not shown, extends rearwardly from the back wall of the trough 8 in overlapping relation to the feed housing 7 at the other vertical side of the latter. The feed housing 7 and the trough 8 are rigidly connected together by means of bolts 8'' which secure the flange 8' to the adjacent side of the feed housing 7, and by means of corresponding bolts, not shown, which secure the other vertical connecting flange of the trough 8 to the other vertical side of the feed housing 7. The feed housing 7 and trough 8 are thus connected to form a rigid header frame which is swingable as a unit about the axis of shaft 1, Fig. 1, by operation of the adjusting mechanism including link 2.

A transversely extending auger conveyer 9 having flighting 10 (Figs. 2 and 10) is rotatably mounted at its opposite ends on upstanding end portions 11 and 12 of the trough 8, the end portions 11 and 12 extending parallel to each other at opposite sides of the header as shown in Figs. 2 and 10. The auger conveyer 9 has an effective axial length greater than the transverse width of the feed housing 7, and is operable in conventional manner to move cut grain within the trough 8 from portions of the latter which overhang the feed housing 7 toward the material receiving opening 7' and into a position where it can be contacted by the forward end of conveyer 6 and elevated thereby to threshing cylinder 5. Transversely spaced end portions 11 and 12 are provided with shoes 13 and 14, respectively, suitably attached by conventional means (not shown) to the forward ends thereof. Shoes 13 and 14 are provided with looped extensions 15 and 16, respectively, which extend forwardly therefrom and curve back to a point of pivotal connection with links 17 (Fig. 1, only one link is shown) which are pivotally connected at their other ends to arms 19 (only one is shown) extending from a rock shaft 21 carried by upper portions of trough structure 8 and which arms normally serve to support a conventional reel structure (not shown).

Figures 5, 6:
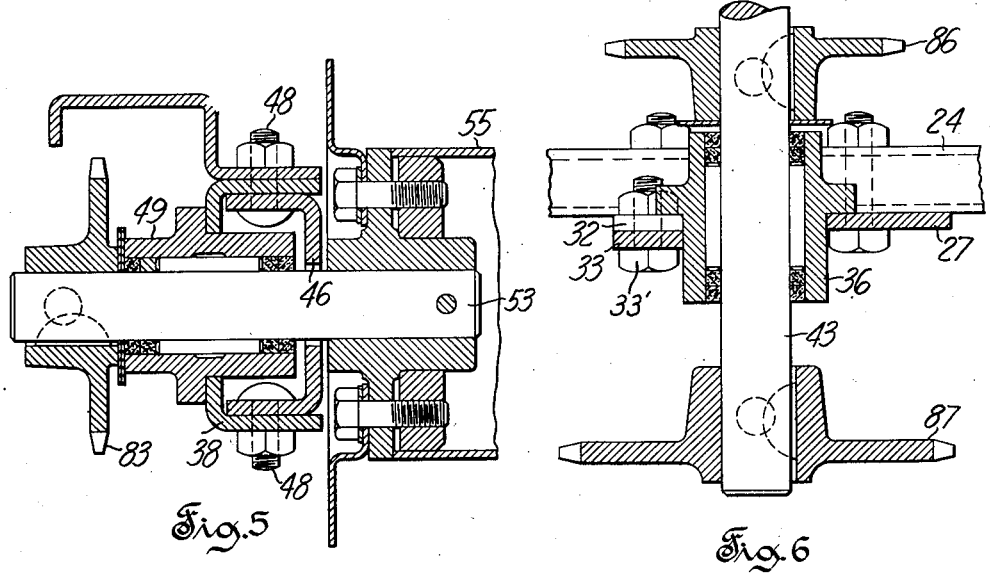
Fig. 5 is an enlarged section taken on line V—V of Fig. 4.
Fig. 6 is an enlarged section taken on line VI—VI of Fig. 4.

Now referring to Fig. 3 it is seen that the forward end of trough structure 8 is provided with a lower transversely extending angle iron 22 suitably attached along the forward end thereof as by bolts 18. A transversely extending rubber covered metal member 23 is attached by bolts 20 to an upper portion of angle 22 and forms a forward extension of the floor of trough structure 8. Also attached to transversely spaced portions of angle iron 22 by bolts 18 are a pair of transversely spaced lower support arms 24 and 26 (Fig. 2) extending forwardly therefrom. A pair of upright mounting plates 27 and 28 for a belt type pickup device 34 are supported from trough structure 8 as by being detachably bolted by means of bolts 30 at lower portions thereof to arms 24 and 26, respectively, and by being detachably bolted by means of bolts 30' at the upper portions thereof to upper brace members 29 and 31, respectively, which are attached at their rearward ends to trough structure 8 by conventional means such as bolts 29' and 31', respectively (Fig. 10). Mounting plate 27 is provided with a rectangular open ended slot 32 (Figs. 4 and 6) extending inward from the forward side thereof and mounting plate 28 is provided with a similar open ended slot (not shown). Plate 27 is provided with a strap 33 which is attachable thereto as by bolts 33' to partially cover slot 32. Plate 28 is provided with a similar strap (not shown) to partially cover the slot therein.

Figure 9:
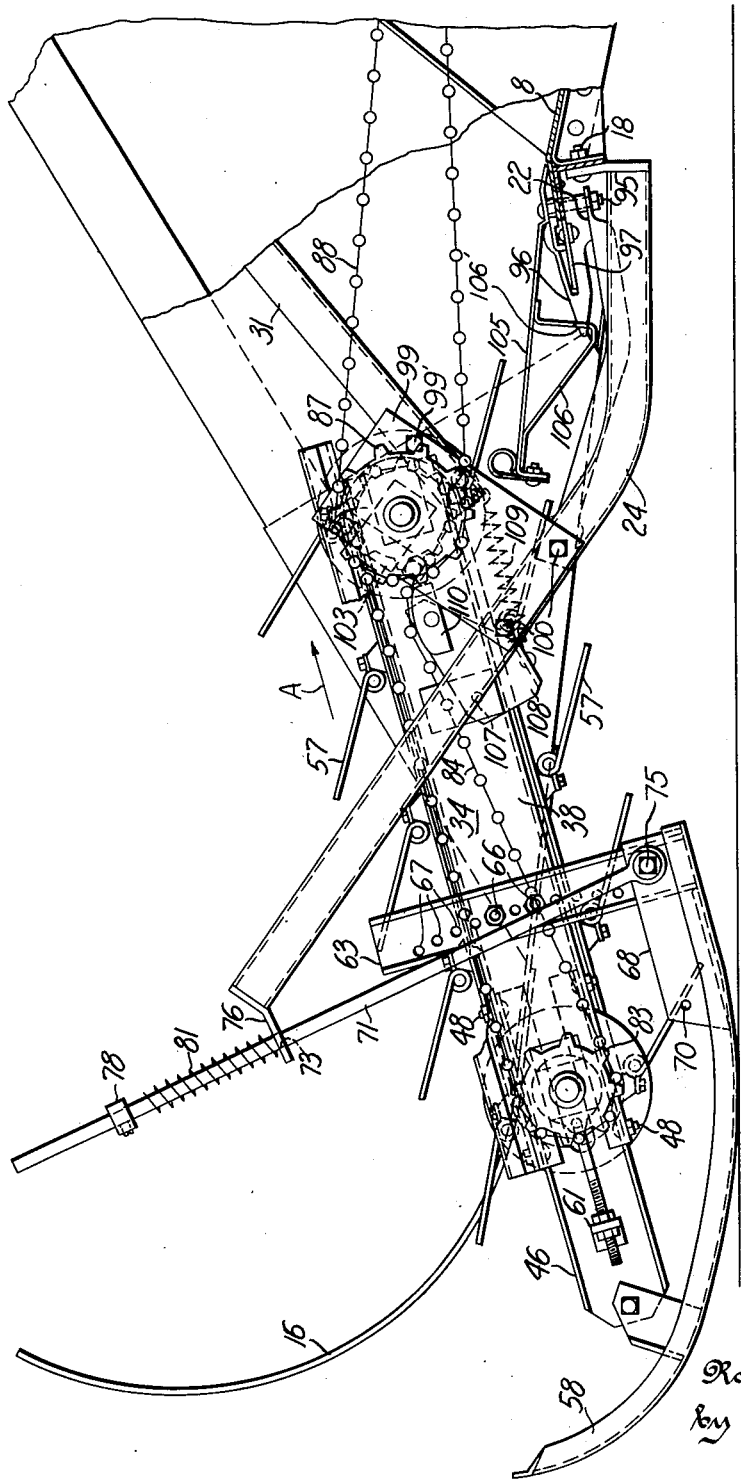
Fig. 9 is an enlarged side elevation view generally similar to Fig. 3 but showing the pickup device in the adjusted position and some parts broken away and some shown in section.

The belt-type pickup device 34 (Figs. 2 and 3) is provided with rear bearings 36 and 37 having portions thereof of square configuration adapted to be snugly slid into slot 32 in plate 27 and the slot (not shown) in plate 28, respectively. Bearing 36 is retained in slot 32 by strap 33 being bolted to bracket 27. Bearing 37 is retained in bracket 28 by a similar strap (not shown) being bolted to bracket 28. Pickup device 34 includes a pair of side channel plates 38 and 39. As shown in Fig. 2, side plates 38 and 39 are provided with rear bearings 41 and 42, respectively. Bearings 36, 41 and 37, 42 rotatably support rear stub shafts 43 and 44, respectively, about which stub shafts a roll 45 is mounted for rotation therewith. Side channel plates or frame members 38 and 39 are provided at their forward ends with extensions 46 and 47, respectively, slidably received therein and which are adjustably attached thereto as by bolts 48 (Fig. 3). A pair of front bearings 49 and 51 are supported, respectively, in slot 52 (Fig. 4) in side frame member 38 and a similar slot (not shown) in side frame member 39. Bearings 49 and 51 rotatably support forward stub shafts 53 and 54, respectively, to which a roll 55 is attached for rotation therewith. An endless belt 56 is mounted about rolls 45 and 55 and has pickup fingers 57 attached thereto. The forward ends of extensions 46 and 47 are pivotally attached by bolts 58' and 59' to ground engaging runners, 58 and 59, respectively, so as to provide for pivotal adjustment of the runners 58 and 59 in raising and lowering directions relative to the forward end of the pickup device 34. The extensions 46 and 47 are provided with belt tighteners 61 and 62, respectively, for positioning bearings 49 and 51 in slot 52 and in the similar slot in extension 47, respectively, to provide the desired tension on belt 56. The rearward ends of runners 58 and 59 are secured to side channel plates 38 and 39, respectively in pivotally adjusted positions, by means of vertical channel irons 63 and 64, respectively, and bolts 66. A series of arcuately arranged holes 67 are provided in channel irons 63 and 64 thereby permitting irons 63 and 64 to be bolted to channel plates 38 and 39, respectively, to provide a desired relation between runners 58 and 59 and the ground. Runners 58 and 59 are provided at their rearward ends with flange members 68 and 69. Each of these flange members is provided with a pair of longitudinally spaced holes 70 and 70'. The lower portions of a pair of load transmitting elements or rods 71 and 72 are pivotally detachably connected to flange members 68 and 69, respectively, as by means of bolts 75 passing through holes 70 (Fig. 9). Flange members 68 and 69 are complementary load transmitting elements adapted to transmit the load of the forward end of the pickup device to the ground, or to load transmitting elements 71 and 72; or to transmit the load to the ground and to the elements 71 and 72. The upper portion of rods 71 and 72 are slidably received in openings 73 and 74, (Fig. 2) respectively, in brackets 76 and 77, respectively, attached to the forward ends of support arms 24 and 26, respectively. Rods 71 and 72 are provided with stop members 78 and 79, respectively, attached thereto adjacent the upper ends thereof, which together with brackets 76 and 77 confine compression springs 81 and 82, respectively, about rods 71 and 72 for limiting counterclockwise pivotal movement of pickup device 34 about stub shafts 43 and 44 (Fig. 3) in response to shoes 58 and 59 following the ground level. Compression springs 81 and 82 also function as counterbalancing means for part of the weight of the forward end of pickup device 34 thereby providing a resilient suspension means and permitting the pickup device to raise readily in response to obstructive ground conditions. A sprocket 83 (Fig. 2) attached to one end of stub shaft 53 is drivenly connected by means of a chain 84 to a sprocket 86 attached to stub shaft 43. Another sprocket 87 is attached to the distal end of shaft 43 and is drivenly connected by means of chain 88 to a sprocket 89 (Fig. 7) attached to shaft 91 of auger conveyer 9 for operation thereby in the direction indicated by an arrow A. Auger conveyer 9 is drivenly connected to the engine (not shown) of the self-propelled harvester. A pair of chain tightening idler sprockets 92 and 93 (Fig. 7) rotatably supported on a side wall of trough structure 8 are also engaged with chain 88 which connects sprockets 87 and 89.

The self-propelled harvester and pickup device when in the condition as shown in Figs. 2 and 3 are specially adapted for picking up and handling light windrows or short stemmed crops because as shown in Fig. 2 pickup fingers 57 when in their most remote rearward position are presenting their distal ends closely adjacent auger flighting 10 in position to deposit crop material close to this flighting to be acted upon thereby. Now if it is desired to operate the harvester-thresher in a long stemmed crop or wherein the crop has been moved into heavy windrows, the pickup device 34 can readily be installed into a new position wherein the long stemmed crop material or heavy windrow can be easily handled because adequate space will be provided for the excess material between the ends of pickup fingers 57 and the auger conveyer 9.

Referring to Figs. 8, 9 and 10, it is seen that the pickup device 34 is shown in its new position. To move pickup device 34 to this position the following steps are taken. Chain 88 (Fig. 3) is removed from sprocket 87 and a few links are added to the chain and plate 23 is removed from angle iron 22. It is seen that a forward upright plate member 99 is attached to support arm 24 as by bolting 100 and a similar upright plate member 101 (Fig. 2) is attached to support arm 26 as by bolting 100' (Fig. 10). Lower forward end portions of brace members 29 and 31 are attached to upper portions of plates 101 and 99, respectively by means of bolts 101' and 99', respectively. Referring to Fig. 3, it is seen that plate 99 is provided with a generally rectangular open ended slot 102 which is the same size as slot 32 (Fig. 4) in mounting plate 27. Plate 101 is also provided with an open ended slot (not shown) similar to slot 102. A strap 103 is bolted to plate 99 in partial overlying relation to slot 102. Plate 101 is provided with a similar strap (not shown). Strap 33 is removed from mounting plate 27 and the strap (not shown) on mounting plate 28 is also removed. Strap 103 is removed from plate member 99 and the strap on plate member 101 is removed. Pickup device 34 is now moved forwardly until rear bearings 36 and 37 are moved forwardly out of the open ended slots in the mounting plates 27 and 28. Rear bearings 36 and 37 are then inserted into slot 102 in plate 99 and the slot (not shown) in plate 101, respectively. Rear bearings 36 and 37 are then slid rearwardly until the rear portion of the slots are contacted. Strap 103 is then bolted to plate 99 and plate 101 has its strap (not shown) bolted thereto thusly retaining bearings 36 and 37 in the slots of plates 99 and 101. Mounting plates 27 and 28 are now removed from support arms 24 and 26, respectively, and from braces 31 and 29, respectively. A conventional sickle bar or cutting mechanism 94 including sickle guards 96 and a sickle bar 97, is mounted forwardly of trough structure 8 with sickle guards 96 being attached to angle iron 22 (Fig. 9) as by bolts 95 with the sickle bar being connected to a lever arm 98 (Fig. 10) adapted to be operated by the harvester-thresher engine (not shown). Preferably the sickle bar is disconnected from a power source when pickup device 34 is connected to the harvester-thresher.

Referring to Fig. 9, it is seen that a floor member 105 is installed to span the space between the rearward end of pickup device 34 and trough structure 8. The rearward end of floor member 105 is attached to sickle guards 96 by means of bolts 95. Floor member 105 is also provided with an underlying brace member 106 provided with a series of openings 106' therein for fitting around the forward ends of guards 96 for support thereby.

If desired the pivotal connection between bracket 68 and rod 71 and bracket 69 and rod 72 may be shifted to the rear portion of these brackets as is indicated in comparing Figs. 3 and 9. This can be accomplished by removing bolts 75 from holes 70 and reconnecting rods 71 and 72 with brackets 68 and 69, respectively, by passing bolts 75 through holes 70'. This adjustment will permit runners 58 and 59 to have a desired contact angle with the ground compensating for the rear end of pickup device 34 now being mounted higher. The contact angle of runners 58 and 59 can also be adjusted by a movement of members 63 and 64 relative to side plates 38 and 39, respectively, by a removal of bolts 66 and reinserting bolts 66 into a different hole 67 in plates 63 and 64 which holes are arcuately arranged in these members. Chain 88 is now reconnected about sprockets 87, 89, 92 and 93 (Fig. 10). The near channel plate 38 (Figs. 3 and 9) is provided with a pin 107 upon which is pivotally mounted a bracket member 108 to which one end of a spring 109 is attached, the other end of spring 109 being connected to channel plate 38 by means of a cotter pin (not shown). Attached to an upper portion of bracket 108 is a block 110 contacting chain 84 and maintaining the desired degree of tension therein as determined by the bias of spring 109.

From the foregoing it is seen that pickup device 34 can readily be shifted from the position shown in Fig. 3 to the position shown in Fig. 9 or the reverse thereof. With the pickup device being capable of being shifted to these two positions of operation, it is possible to efficiently handle substantially all kinds of windrowed crops.

It should also be apparent that pickup device 34 can be readily removed from the harvester-thresher and by operatively reconnecting the sickle mechanism 94 up to the engine drive (not shown) of the harvester-thresher a conventional combine machine is obtained.

In general terms, the herein disclosed pickup attachment comprises a belt type pickup device which is operable to convey material longitudinally from one end thereof to the other and which has a pair of transversely extending rotatable supporting shaft portions at said other end. In the illustrated embodiment of the invention such supporting shaft portions are represented by the rear stub shafts 43 and 44. A pair of transversely spaced, upright mounting plates for the pickup device, as represented by the plates 27 and 28, have open ended slots, respectively, in straddling relation to said supporting shaft portions. The bearings 36 and 37, the straps 33 and bolts 33' (Fig. 4) represent means cooperable with said shaft portions and mounting plates to releasably secure said shaft portions against withdrawal from the open ends of said slots. The forward upright plate members 99 and 101 present open ended slots, respectively, adapted to receive the supporting shaft portions at the rear end of the pickup device upon removal of said supporting shaft portions from the upright mounting plates 27 and 28.

It should be understood that it is not intended to limit the invention to the exact details of construction and combination herein disclosed by way of example, as various modifications within the scope of the appended claims may occur to persons skilled in the art.

It is claimed and desired to secure by Letters Patent:

1. A pickup attachment for mounting on the header structure of a harvester-thresher comprising, in combination, a belt type pickup device operable to convey material longitudinally from one end thereof to the other and having a pair of transversely extending supporting shaft portions at said other end; a pair of transversely spaced, upright mounting plates for said pickup device having open ended slots, respectively, in straddling relation to said supporting shaft portions; means cooperable with said shaft portions and mounting plates to releasably secure said shaft portions against withdrawal from the open ends of said slots; a pair of lower support arms secured, respectively, to said mounting plates and adapted for connection to transversely spaced lower portions, respectively, of said header structure in forwardly extending relation thereto; an upper pair of brace members secured, respectively, to said mounting plates and adapted for connection to transversely spaced upper portions, respectively, of said header structure in forwardly extending relation thereto; and a pair of upright plate members secured, respectively, to portions of said support arms forwardly of said mounting plates and to forward portions, respectively, of said brace members, said last mentioned plate members presenting open ended slots, respectively, adapted to receive said shaft portions upon removal of the latter from said mounting plates.

2. A pickup attachment as set forth in claim 1, comprising separable connecting means securing said mounting plates, respectively, in detachable relation to said lower support arms, and separable connecting means securing said mounting plates, respectively, in detachable relation to said upper brace members.

3. A pickup attachment as set forth in claim 1 and further comprising resilient suspension means operatively interposed between said one end of said pickup device and forwardly and upwardly extended portions of said lower support arms.

4. A pickup attachment as set forth in claim 1 and further comprising a pair of ground engaging runners, pivot means connecting said runners with said pickup device at said one end of the latter for adjustment relative thereto in raising and lowering directions, and detachable fastening means for securing said runners in pivotally adjusted positions relative to said pickup device.

5. A pickup attachment as set forth in claim 4 and further comprising resilient suspension means operatively interposed between forwardly and upwardly extended portions of said lower support arms and said runners.

References Cited in the file of this patent

UNITED STATES PATENTS

| | | |
|---|---|---|
| 1,863,637 | Richardson | June 21, 1932 |
| 1,923,104 | Mainland | Aug. 22, 1933 |
| 2,324,261 | Krause | July 13, 1943 |
| 2,363,888 | Martin | Nov. 28, 1944 |
| 2,517,413 | Pearson | Aug. 1, 1950 |
| 2,524,196 | Hyman | Oct. 3, 1950 |
| 2,541,523 | Lang | Feb. 13, 1951 |